(12) United States Patent
Lee

(10) Patent No.: US 8,881,465 B2
(45) Date of Patent: Nov. 11, 2014

(54) DOOR SEALING STRUCTURE FOR MOTOR VEHICLE

(71) Applicant: Hyundai Motor Company, Seoul (KR)

(72) Inventor: Jong Hae Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/045,503

(22) Filed: Oct. 3, 2013

(65) Prior Publication Data

US 2014/0157678 A1 Jun. 12, 2014

(30) Foreign Application Priority Data

Dec. 6, 2012 (KR) .......................... 10-2012-0141297

(51) Int. Cl.
*E06B 7/22* (2006.01)
(52) U.S. Cl.
USPC ........................................ 49/498.1; 49/489.1
(58) Field of Classification Search
USPC ................... 49/498.1, 489.1, 475.1, 493.1
See application file for complete search history.

(56) References Cited

U.S. PATENT DOCUMENTS

| 2,705,655 | A | * | 4/1955 | Flemming et al. ............ 277/645 |
| 3,491,825 | A | * | 1/1970 | Matson et al. ................ 164/228 |
| 4,448,430 | A | * | 5/1984 | Bright ............................ 277/642 |
| 4,455,785 | A | * | 6/1984 | Wahr et al. .................... 49/498.1 |
| 5,050,349 | A | * | 9/1991 | Goto et al. .................... 49/489.1 |
| 5,826,378 | A | * | 10/1998 | Gallas .......................... 49/498.1 |
| 6,119,404 | A | * | 9/2000 | Bschorr et al. ............... 49/498.1 |
| 6,601,346 | B2 | * | 8/2003 | Nozaki ........................ 49/498.1 |
| 6,668,489 | B2 | * | 12/2003 | Baba et al. ................... 49/498.1 |
| 6,877,279 | B2 | * | 4/2005 | Russell et al. ............... 49/498.1 |
| 7,077,450 | B2 | * | 7/2006 | Kohara et al. ................ 296/39.3 |
| 2002/0036414 | A1 | * | 3/2002 | Nozaki et al. ............... 296/146.9 |
| 2006/0005472 | A1 | * | 1/2006 | Miller ......................... 49/498.1 |

FOREIGN PATENT DOCUMENTS

| JP | 05-049439 U | 6/1993 |
| JP | 2002-067824 A | 3/2002 |
| JP | 2002-274285 A | 9/2002 |
| JP | 2006-044529 A | 2/2006 |

* cited by examiner

*Primary Examiner* — Jerry Redman
(74) *Attorney, Agent, or Firm* — McDermott Will & Emery LLP

(57) ABSTRACT

A door sealing structure for a motor vehicle includes a receiving recess provided at the door inner panel, a door weather strip of which a partial portion is inserted into the receiving recess so as to be rotatably supported and formed with a size capable of protruding outside from the receiving recess, and an elastic member being installed in and supporting the door weather strip elastically for preventing the door weather strip from being detached from the receiving recess, thereby reducing a closing force of a door and improving an airtightness performance.

10 Claims, 4 Drawing Sheets

DOOR SEALING STRUCTURE FOR MOTOR VEHICLE

CROSS-REFERENCE TO RELATED APPLICATION

This application is based on and claims the benefit of priority to Korean Patent Application No. 10-2012-0141297 filed in the Korean Intellectual Property Office on Dec. 6, 2012, the entire contents of which are incorporated herein by reference.

TECHNICAL FIELD

The present disclosure relates to a door sealing structure for a motor vehicle, and more particularly, to a door sealing structure for a motor vehicle having a door weather strip capable of rotating motion.

BACKGROUND

In general, a weather strip is made of an excellent elastic rubber material and serves to maintain air-tightness.

The weather strip has been adapted to a motor vehicle as a body side weather strip mounted on a vehicle body panel of the motor vehicle, a door side weather strip (or referred to as a door weather strip) mounted to a door of the motor vehicle, and so on.

The door weather strip is mounted on a door panel along the entire circumference of the door so as to maintain air-tightness of a passenger side compartment when the door is closed and has a tight contact with a sealing surface of the vehicle body panel matching the door when the door is closed.

The door weather strip is overlapped with the vehicle body panel by a predetermined amount to improve the air-tightness when the door is closed.

When the door is closed so that the door weather strip is overlapped with the vehicle body panel, the door weather strip is elastically deformed from the original shape thereof and has the tight contact with the sealing surface of the vehicle body panel by virtue of an elastic repulsive force against a shape deformation thereof, thereby appropriately maintaining the air-tightness of the inside of the passenger compartment room even when the motor vehicle is being driven.

When the shape deformation, however, is repeatedly caused in the door weather strip due to the overlapping condition, the elastic force of the material of the door weather strip will be progressively reduced as time passes, and thus the air-tightness performance of the door weather strip will be deteriorated.

Furthermore, the repulsive force (or reaction force) of the door weather strip generated by the elasticity of the material thereof acts as an external force pushing the door in the open direction, thereby increasing the closing force of the door.

The closing force of the door means a magnitude of force needed to close the door, and which is a resultant force of a reaction force of the door weather strip and a locking force of components like a door latch, etc.

Therefore, the bigger the reaction force of the weather strip becomes, the greater the closing force of the door. As a result, a more strength and more rapid speed are required to close the door, and also the process of closing and opening the door may not be smoothly achieved.

Furthermore, the increased closing force of the door increases an operation noise of components related to a door locking operation, and opening operation sensitivity is deteriorated when the door is opened, thereby deteriorating a user's satisfaction.

Accordingly, when designing the door weather strip, a reaction force of the door weather strip has been determined considering the optimum level of the air-tightness performance and the closing force of the door, improving a simultaneously satisfaction on the air-tightness performance and the reasonable closing force of the door is difficult The above information disclosed in this background section is only for enhancement of understanding of the background of the present disclosure and therefore it may contain information that does not form the prior art that is already known in this country to a person of ordinary skill in the art.

SUMMARY

The present disclosure has been made in an effort to provide a door sealing structure for a motor vehicle having advantages of improving sensitivity by reducing a closing force of a door, and improving an air-tightness performance by contacting a vehicle body panel with an increased contacting force.

An exemplary embodiment of the present inventive concept provides a door sealing structure for a motor vehicle, including a receiving recess of a door inner panel, a door weather strip of which a partial portion is inserted into the receiving recess so as to be rotatably supported and formed with a size capable of protruding outside from the receiving recess, and an elastic member being installed in and elastically supporting the door weather strip for preventing the door weather strip from being detached from the receiving recess.

The receiving recess may be formed by a fixing bracket integrally formed at the door inner panel.

The receiving recess may be formed by a fixing bracket attached to the door inner panel.

The door weather strip may include a weather strip body in which the elastic member is installed, and a restoring lip formed extendedly outward in a diameter direction from the weather strip body so as to be elastically deformed.

A receiving hole may be formed in the weather strip body, and the elastic member may be inserted into and installed in the receiving hole.

The receiving hole may be formed in an oval shape.

The length from the receiving hole to an exterior circumference surface of the weather strip body may be varied along the receiving hole.

The elastic member may include an elastic string or an elastic wire.

The fixing bracket may include a cross-section of a "U"-shaped form with an opened side so as to form the receiving recess.

At least one protrusion may be formed at the weather strip body so as to protrude outward in a diameter direction and tightly contact a vehicle body panel so that a friction surface may be increased when a door is closed.

In accordance with the door sealing structure for a motor vehicle according to an exemplary embodiment of the present inventive concept, while a door is closed, the door weather strip rotates on the door inner panel to reduce the closing force of the door, thereby improving sensitivity thereof.

Furthermore, the door weather strip is appropriately elastically deformed between the door inner panel and the vehicle body panel and tightly contacts the vehicle body panel with an increased contacting force, thereby improving the air-tightness performance and lengthening a span of service life, and strengthening a durability by virtue of an appropriate elastic deforming motion thereof.

DETAILED DESCRIPTION OF THE EMBODIMENTS

Hereinafter, an exemplary embodiment of the present inventive concept will be described in detail with reference to the accompanying drawings.

Figure 1:
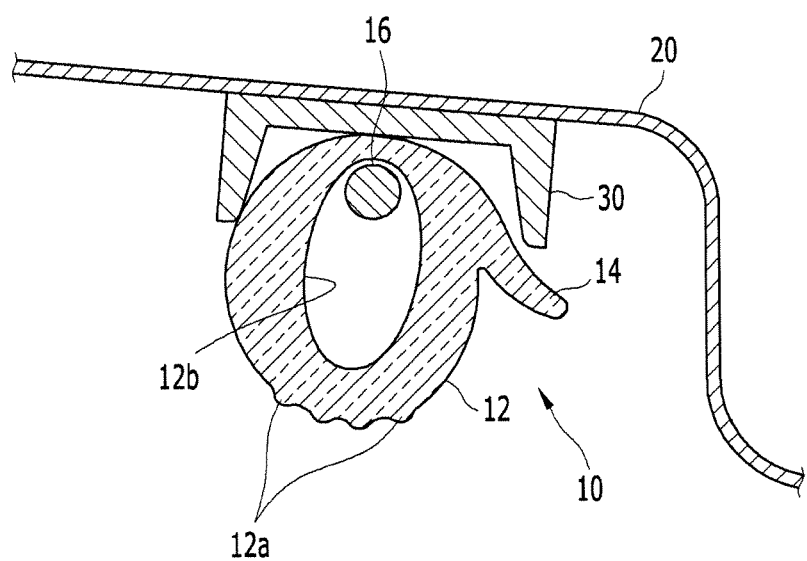
FIG. 1 is a cross-sectional view in which a door weather strip for a motor vehicle, according to an exemplary embodiment of the present inventive concept, is mounted on a door inner panel of a motor vehicle.

Referring to FIG. 1, a door sealing structure according to an exemplary embodiment of the present inventive concept includes a door weather strip 10 mounted on and supported by a door panel, in particular a door inner panel 20.

A fixing bracket 30 for mounting the door weather strip 10 is attached to the door inner panel 20.

The fixing bracket 30 includes a substantially "U"-shaped cross-section having one surface opened so as to form an opening portion and a receiving recess formed inward and concavely.

The door weather strip 10 is inserted into the receiving recess of the fixing bracket 30 so as to be rotatably supported.

The fixing bracket 30 may be formed by compressing an elastic material such as rubber or flexible plastic, and is attached to the door inner panel 20 using clips or an adhesive tape, and so on.

In a case when the door inner panel 20 is made of nonferrous metals such as aluminum or magnesium and so on, by using a process of casting and others, the fixing bracket 30 may be integrally formed together with the door inner panel 20.

The door weather strip 10 includes a weather strip body 12 having a substantially circular shape.

The weather strip body 12 needs not be formed in the circular shape, but needs to be formed in a continuous shape such as an oval shape.

A restoring lip 14 may be formed to integrally extend from an outer circumference surface of the weather strip body 12 protruding outwards.

The restoring lip 14 may be slanted with respect to the weather strip body 12.

That is, the restoring lip 14 can be formed so that an appropriate interval angle between the restoring lip 14 and the weather strip body 12 may exist.

The space formed by the interval angle between the restoring lip 14 and the weather strip body 12 may be used in such a manner that the restoring lip can be bent therein.

The weather strip body 12 is formed so as to have a diameter that is smaller than a width of the receiving recess and larger than a height of the fixing bracket 30.

Therefore, a partial portion of the weather strip 12 can be inserted into and supported by the receiving recess, and the weather strip 12 can protrude outward with the partial portion thereof inserted into the receiving recess.

A protrusion 12a is formed so as to protrude outward in a diameter direction on an outer circumference of the weather strip body 12.

The protrusion 12a serves to increase the friction area between the weather strip 12 and a vehicle body panel (not shown).

A receiving hole 12b may be formed in a substantially oval shape inside of the weather strip body 12.

Therefore, the length from the receiving hole 12b to the outer surface of weather strip body 12 is varied.

An elastic wire or elastic string 16 as an elastic member capable of being elastically deformed is inserted into the receiving hole 12b.

In an assembling process of the door weather strip 10 having the above-described structure, the fixing bracket 30 is mounted on the door inner panel 20 and then door weather strip 10 is pulled and inserted into the receiving hole of the fixing bracket 30, thereby improving assembling workability and productivity of the door weather strip 10.

Figure 2:
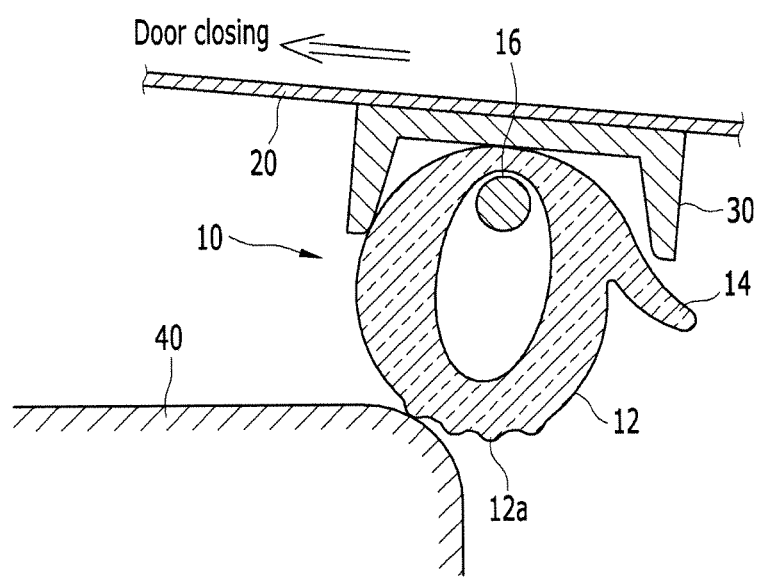
FIG. 2 is a cross-sectional view explaining a state when a door for a motor vehicle, on which a door weather strip according to an exemplary embodiment of the present inventive concept is mounted, is about to be closed.

In a state that the door weather strip 10 having the above-described structure according to an exemplary embodiment of the present inventive concept is mounted on the door inner panel 20, when the door is closed, a portion where the protrusion 12a of the door weather strip 10 is formed firstly contacting the vehicle body panel 40 as shown in FIG. 2.

Figure 3:
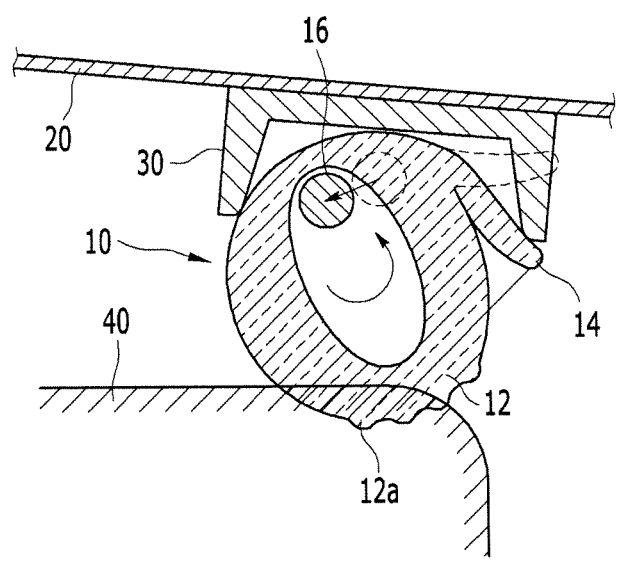
FIG. 3 is a cross-sectional view showing an operational state of a door weather strip according to an exemplary embodiment of the present inventive concept when a door for a motor vehicle, on which the door weather strip is mounted, is closed.
Figure 4:
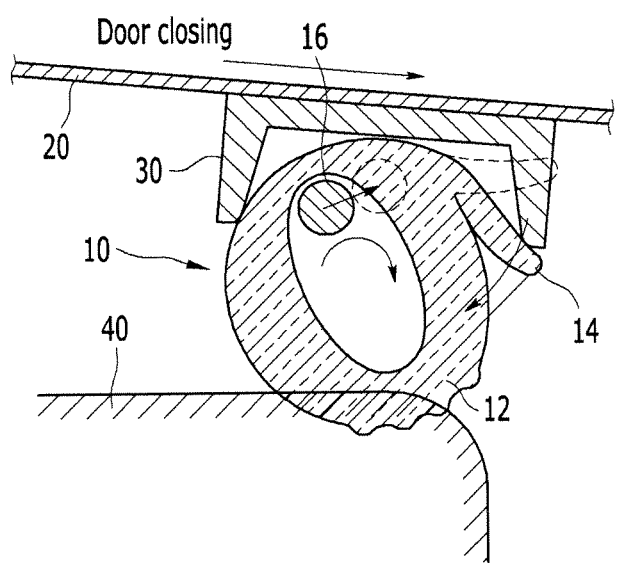
FIG. 4 is a cross-sectional view showing an operational state of a door weather strip according to an exemplary embodiment of the present inventive concept when a door for a motor vehicle, on which the door weather strip is mounted, is opened.

As the closing operation of the door is performed, a portion where the protrusion 12a of the door weather strip 10 is formed tightly contacts the vehicle body panel 40 and the weather strip body 12 rotates in the receiving recess of the fixing bracket 30 based on the tightly contacted portion being served as a supporting point according to the closing motion of the door inner panel 20, as shown in FIG. 3.

The protrusion 12a of the weather strip body 12 increases a tight contact area on the vehicle body panel 40 for the weather strip body 12 to rotate smoothly on the vehicle body panel 40 without sliding.

Therefore, the phenomenon in which the closing force of the door is increased due to an excessive sliding friction between the weather strip 10 and the vehicle body panel 40 can be lessened, and the closing force of the door can be reduced to an appropriate level when the door is closed, thereby improving sensitivity.

When the weather strip body 12 rotates while the door is closed, the elastic string 16 is forcibly pulled by the weather strip body 12 to preserve elastic restoring energy as shown by the solid arrow.

Furthermore, the elastic reaction force of the elastic string 16 prevents the weather strip body 12 and the receiving recess of the fixing bracket 30 from being detached.

The restoring lip 14 moves toward the fixing bracket 30 by the rotating motion of the weather strip body 12. As a result, the restoring lip 14 is pressed by the fixing bracket 30 to be elastically deformed toward the weather strip body 12 so that an elastic restoring force is preserved in the restoring lip 14.

The weather strip body 12 is pressed by as much as the width of the gap between the door inner panel 20 and the vehicle body panel 40 so that the weather strip body 12 having a tight contact with the vehicle body panel 40 by a strong reaction force, thereby improving the air-tightness performance.

When the door is opened after being closed, the elastic string 16 is returned to its original position by its restoring force generated by being pulled during the closing process of the door, and this elastic restoring force of the elastic string 16 acts to rotate the weather strip body 12 in the clockwise direction toward its original position.

Furthermore, the weather strip body 12 is returned to its original position and restored to its original shape by the restoring force, and the elastic restoring force of the restoring lip 14 preserved during the closing process of the door acts to rotate the weather strip body 12 in the clockwise direction, whereby the weather strip body 12 is promptly returned to its original position.

While this inventive concept has been described in connection with what is presently considered to be practical exemplary embodiments, it is to be understood that the present inventive concept is not limited to the disclosed embodiments, but, on the contrary, is intended to cover various modifications and equivalent arrangements included within the spirit and scope of the appended claims.

What is claimed is:

1. A door sealing structure for a motor vehicle, comprising:
   a receiving recess provided at a door inner panel;
   a door weather strip of which a partial portion is inserted into the receiving recess so as to be rotatably supported and formed with a size capable of protruding outside from the receiving recess; and
   an elastic member being installed in and elastically supporting the door weather strip for preventing the door weather strip from being detached from the receiving recess,
   wherein the door weather strip includes:
   a weather strip body in which the elastic member is installed; and
   a restoring lip extending outward in a diameter direction from the weather strip body so as to be elastically deformed.

2. The door sealing structure of claim 1, wherein
   the receiving recess is integrally formed by a fixing bracket at the door inner panel.

3. The door sealing structure of claim 1, wherein
   the receiving recess is formed by a fixing bracket attached to the door inner panel.

4. The door sealing structure of claim 3, wherein
   the fixing bracket includes a cross-section of a "U"-shaped form with an opened surface so as to form the receiving recess.

5. The door sealing structure of claim 1, wherein:
   a receiving hole is formed in the weather strip body; and
   the elastic member is inserted into and installed in the receiving hole.

6. The door sealing structure of claim 5, wherein
   the receiving hole has an oval shape.

7. The door sealing structure of claim 6, wherein
   the length from the receiving hole to an outer circumference surface of the weather strip body varies along the receiving hole.

8. The door sealing structure of claim 1, wherein the elastic member includes an elastic string or an elastic wire.

9. The door sealing structure of claim 1, wherein
   at least one protrusion formed at the weather strip body protrudes outward in a diameter direction and tightly contacts a vehicle body panel so that a friction surface between the weather strip body and the vehicle body increases when a door is closed.

10. The door sealing structure of claim 1, wherein
    the weather strip body is pressed by the vehicle body panel and seals the gap between the vehicle body panel and the door inner panel when a door is closed.

* * * * *